T. A. EDISON.
DEVICE FOR FEEDING PULVERULENT MATERIAL.
APPLICATION FILED JUNE 11, 1908.
993,294.
Patented May 23, 1911.
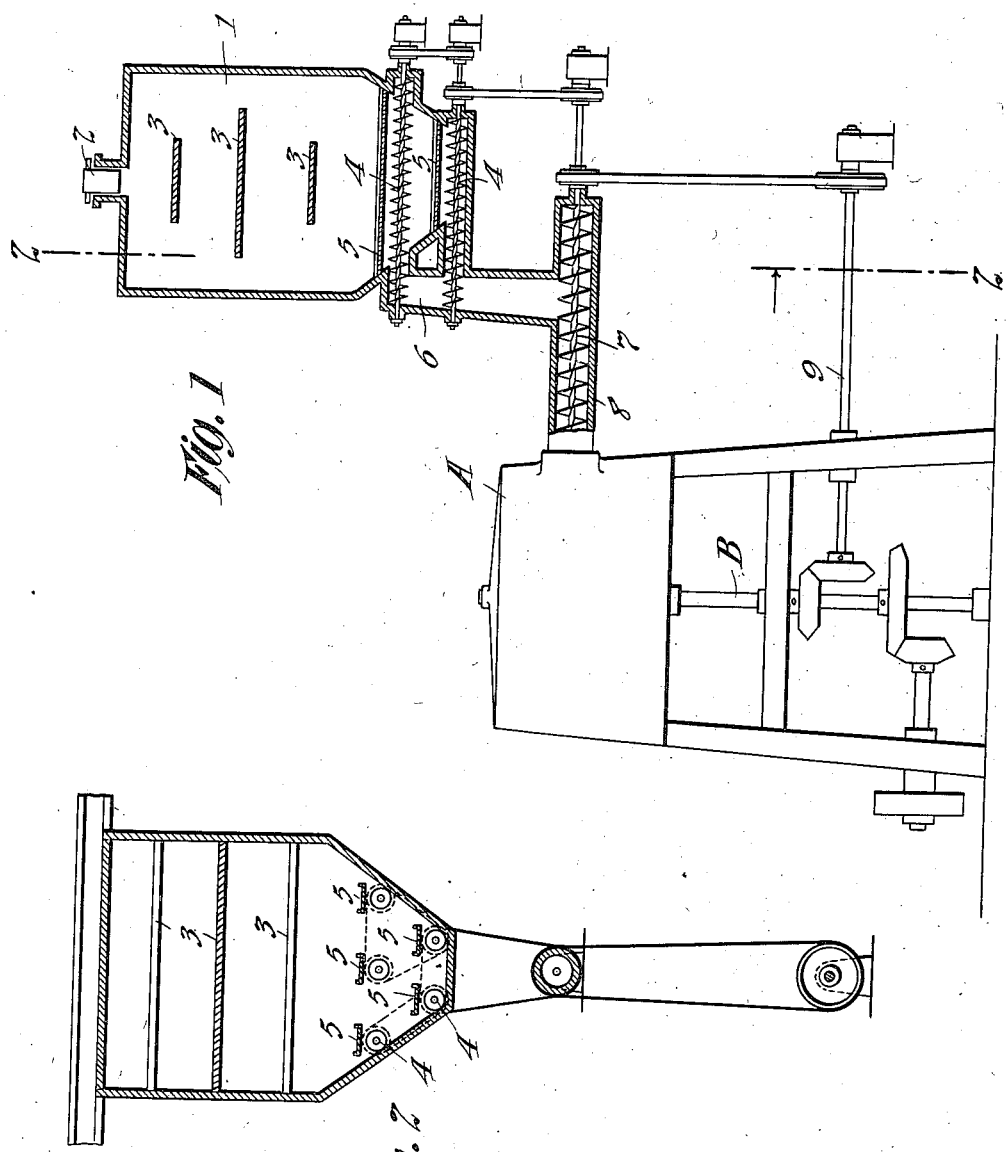

UNITED STATES PATENT OFFICE.

THOMAS A. EDISON, OF LLEWELLYN PARK, ORANGE, NEW JERSEY.

DEVICE FOR FEEDING PULVERULENT MATERIAL.

993,294.

Specification of Letters Patent. Patented May 23, 1911.

Application filed June 11, 1908. Serial No. 437,845.

*To all whom it may concern:*

Be it known that I, THOMAS ALVA EDISON, a citizen of the United States, residing at Llewellyn Park, Orange, county of Essex, and State of New Jersey, have invented certain new and useful Improvements in Devices for Feeding Pulverulent Material, of which the following is a description.

My invention relates to improvements in apparatus for continuously and uniformly feeding very finely, pulverulent material in any industrial art where an approximately uniform feed is necessary. Instances of this kind are frequently encountered in industrial operations. In some cases, the successful operation of an apparatus is dependent upon the uniformity with which raw material may be supplied to the same and in other cases effective operation is secured when two or more pulverulent raw materials are supplied to the apparatus in substantially exact proportions. The problem is sometimes encountered where pulverulent material is to be fed with substantially exact uniformity to a grinding or pulverizing mill. In other cases, the problem is encountered where pulverized coal is required to be fed with substantial uniformity to a burner in which it is consumed. And, in the case of rotary cement kilns, the problem in a very marked degree is encountered in connection with the feeding of finely ground raw material into the same for calcination.

Many pulverulent materials, notably finely ground cement rock and limestone that is used in the manufacture of Portland cement, flow with great irregularity, sometimes clotting and packing so as to absolutely interrupt the flow, and at other times apparently flowing with the facility of liquid. In fact, as is well known, a bucketful of this chalk deposited upon a perfectly flat floor will spread out over a very great area. Attempts have been made to feed these pulverulent materials, such as cement chalk by means of screw conveyers, but uniformity in such feed has not been secured. Frequently the material packs together so as to bridge over the conveyer, so that little or no material is fed and suddenly the bridge will break and the material will be forced by its weight longitudinally of the conveyer so that the amount passed out of the feeding apparatus will be enormously greater than that which would be normally due to the feeding capacity of the screw. In other words, in attempting to feed a pulverulent material, such as cement chalk by means of a screw conveyer, the feed is seldom proportional to the feeding capacity of the screw, but varies from practically nothing to an amount enormously greater than such capacity. In application for Letters Patent, filed February 5, 1906, Serial No. 299,484, I propose to equalize these variations in the feeding capacity of a screw conveyer for use for feeding pulverized chalk to the cement kiln by employing a screw conveyer of very small pitch within the storage bin, turning at a relatively high speed, and a second screw of greater pitch for receiving the material therefrom and introducing it into the kiln, the idea being that the small pitch of the first screw would prevent the material from being forced longitudinally past the same. Such an arrangement, however, would not prevent the material from bridging or packing above the conveyer, and even with a fine pitch screw, the material sometimes flows with sufficient facility to be forced longitudinally past the same. By means of my present apparatus I produce a device for the purpose, by which a very much more equal feed of the material can be secured.

To this end, the invention comprises the utilization of a plurality, and preferably a considerable number of screws or other suitable conveyers, mounted in the lower part of the storage bin, all of which screws direct the material toward the point of use and preferably supply the material to a single main conveyer whose capacity is substantially equal to the combined capacities of the first screws. By thus employing a plurality of feeding devices for removing the material from the storage receptacle, any variations in the feed of one of them will effect a proportionately reduced variation in the total feed. For example, if only a single screw is employed and the material bridges above it, as sometimes happens, the entire feed would be cut off, but if five screws are used, the total stoppage of the feed by one screw would effect a reduction of only 20% of the total feed. In the same way if the material should avalanche or be forced by its weight past any one of the five screws, the added effect on the combined feed would be only one-fifth as great as if only a single screw were used. By employing a plurality of feeding screws in the storage receptacle, the material is kept more constantly in agitation than if a single screw is used, and there is therefore less likelihood of the material bridging or packing above any of the screws. But in order to further reduce this possibility, I prefer to make use of a shelf or platform above each screw, so that the material will come into contact with each screw around the edges of these shelves. In this way, the sides and bottom of the screws effect a feeding movement and the tops of the screws are substantially clear, so that there is no opportunity of the screws boring a tunnel, so to speak, in the material to augment the tendency of the latter to pack. The tendency of the material to pack is further reduced since the shelves reduce the pressure of the material in the neighborhood of the conveyer screws.

In order that the invention may be more fully understood, reference is made to the accompanying drawing, of which—

Figure 1 is a side elevation, partly in section, showing the feed device constructed in accordance with my invention; and Fig. 2 a section on the line 2—2 of Fig. 1.

In both of these views, corresponding parts are represented by the same numerals of reference.

The apparatus shown comprises a rotary mill, mixer, kiln, or other device A, adapted to receive a continuous feed of pulverulent material. The said material is contained in bulk in a receptacle 1 supplied in any suitable manner as by a traveling conveyer 2, which dumps or scrapes the material into the top thereof. Extending across the upper portion of the receptacle 1 are a plurality of horizontal shelves 3, arranged in different vertical planes. Below the lowermost shelf 3 are a plurality of conveyers, preferably feeding screws 4, the axes of which extend transversely to the shelves 3. Five of these screws are shown arranged in different horizontal and vertical planes and the arrangement illustrated is a desirable one in practice. Obviously, there are many arrangements which can be used and the number of screws may be varied considerably, the main idea being to use a sufficient number of screws so that any variation in the feed of one will not objectionably affect the total feed and to so arrange them that the material will settle over a considerable area within the receptacle without the formation of holes or tunnels, which eventually cause the avalanching of the material. Above each screw 4 and parallel therewith, is a guard or shelf 5, which tends to render the top portion of the screw inactive, and thereby reduces its tendency to form arches or holes in the material. A sufficient space is allowed between these shelves to permit the material to descend readily and evenly into contact with the operative portions of the several screws. All of the screws 4 discharge into a vertical trunk 6, the lower end of which communicates with a horizontal main screw 7, operating in a trough 8, leading to the interior of the machine or apparatus A. In the device shown, the rotating elements B of the apparatus A, are geared to the shaft 9, which drives the shafts of the various conveyers 4 and 7 respectively, through belts and pulleys, as shown, and while this arrangement is desirable in order to cause the rate of feed of the several screws to vary proportionately to the speed of the apparatus to which the material is supplied, such a driving connection is not indispensable and the screws may be operated independently. The capacity of the main screw 7 is sufficient to accommodate and properly feed the material supplied thereto by all of the screws 4, as will be obvious.

Having now described my invention, what I claim is:

1. In an apparatus of the class described, the combination of a receptacle adapted to contain a body of pulverulent material, and a plurality of parallel screw conveyers arranged in different horizontal and vertical planes and adapted to cause the material to settle uniformly over an area of considerable horizontal extent, substantially as set forth.

2. In an apparatus of the class described, the combination of a receptacle adapted to contain a body of pulverulent material, a plurality of parallel screw conveyers arranged in different horizontal planes and adapted to cause the material to settle uniformly over an area of considerable horizontal extent and means for rotating said conveyers to cause the same to feed the material from said receptacle toward a common point, substantially as set forth.

3. In an apparatus of the class described, the combination of a receptacle adapted to contain a body of pulverulent material, and a plurality of feed screws situated near the bottom of said receptacle, and occupying different vertical planes, whereby the material is permitted to settle gradually over an area of considerable horizontal extent, and a guard or shelf above each of said conveyers, substantially as set forth.

4. In an apparatus of the class described, the combination of a receptacle adapted to contain a body of pulverulent material, and a plurality of parallel screw conveyers arranged in different horizontal and vertical planes and adapted to cause the material to settle uniformly over an area of considerable horizontal extent and a guard or shelf above each of said conveyers, substantially as set forth.

5. In an apparatus of the class described, the combination of a receptacle adapted to contain a body of pulverulent material, a horizontal screw conveyer near the bottom thereof and a horizontal guard or shelf immediately above and parallel to said screw conveyer and extending the full length thereof, said conveyer being guarded at the sides thereof, substantially as set forth.

6. In an apparatus of the class described, the combination of a receptacle adapted to contain a body of pulverulent material, a plurality of horizontal screw conveyers situated near the bottom of said receptacle, and adapted to feed the material therefrom toward a common point, and a guard or shelf immediately above and parallel to each conveyer, and extending the full length thereof, said shelves being of approximately the same width as the diameters of said conveyers, said shelves being spaced apart sufficiently to permit the material to descend evenly between the same into contact with said conveyers, substantially as set forth.

This specification signed and witnessed this 8th day of June 1908.

THOS. A. EDISON.

Witnesses:
  FRANK L. DYER,
  FRANK D. LEWIS.